123,658

UNITED STATES PATENT OFFICE.

NATHAN B. ABBOTT, OF BROOKLYN, NEW YORK, ASSIGNOR TO HIMSELF, JOHN P. CRANFORD, AND HENRY L. CRANFORD, OF SAME PLACE.

IMPROVEMENT IN COMPOSITION PAVEMENTS AND SIDEWALKS.

Specification forming part of Letters Patent No. 123,658, dated February 13, 1872.

*To all whom it may concern:*

Be it known that I, NATHAN B. ABBOTT, of Brooklyn, in the county of Kings and State of New York, have invented an Improvement in Composition Walks; and the following is declared to be a correct description thereof.

Walks have heretofore been made of tar, sand, gravel, and ashes, as in the patent of George Scrimshaw, granted August 21, 1860, No. 29,722, and other compounds containing tar have been employed, and attempts have been made to apply a coating of paint to this surface, to remove the objectionable black appearance resulting from the tar. The color, however, from the tar quickly strikes through such paint, spoiling the appearance.

The object of this invention is to obtain an ornamental surface for walks and pavements, in which sand, gravel, and tar, or similar materials, form the foundation.

The method pursued in mixing the ingredients and laying the foundation being known and set forth in the aforesaid and other patents, a further description is not required.

Upon the foundation a coating of hydraulic or other water cement is laid to prevent the tar striking through to the surface under the action of the sun's rays. This coating fills the interstices and makes a smooth surface for the reception of the ornamental composition. I take the material known and sold in the trade under the name of Crockett's composition, or other material possessing similar properties, and mix with the same ground slate, stone, or other mineral substance, to give the necessary body, and add to the same a dryer—such as litharge—to aid in a sufficiently rapid hardening, and pigments of any desired character may also be added to give the desired color. This compound is laid with uniformity over the surface of the walk, or it may be laid in diamonds, squares, or other ornamental figures, in one or more colors; and previous to its hardening a coating of clean sand, preferably white, is spread upon the surface, and after a sufficient time has elapsed—from one to four days—the composition surface will become perfectly hard and impervious to moisture; and I remark that this composition may be laid upon the wet cement and will adhere, and it is not injured by water from rain during the progress of the work, and when this composition hardens it renders the walk or floor much more durable than those heretofore laid, because there is not any injury resulting from the action of water or the atmosphere on the composition.

I claim as my invention—

The composition surface specified, applied over a coating of cement upon a foundation containing tar, substantially as specified.

Signed by me this 18th day of October, A. D. 1871.

NATHAN B. ABBOTT.

Witnesses:
GEO. T. PINCKNEY,
CHAS. H. SMITH.